United States Patent Office 3,449,276
Patented June 10, 1969

3,449,276
TRIPLE ACCELERATOR SYSTEM FOR PROMOTING THE CURE OF FREE-RADICAL CATALYZED UNSATURATED POLYESTER RESINS
Ronald R. Rabenold and Earl E. Parker, Allison Park, Pa., assignors to PPG Industries, Inc., a corporation of Pennsylvania
No Drawing. Continuation-in-part of application Ser. No. 473,491, July 20, 1965. This application Mar. 26, 1968, Ser. No. 715,957
Int. Cl. C08g 17/02, 17/04
U.S. Cl. 260—22      16 Claims

ABSTRACT OF THE DISCLOSURE

A novel triple accelerator system for promoting the cure of free-radical catalyzed unsaturated polyester resins comprises an accelerator system containing in synergistic amount, (1) a cobalt salt, (2) a salt of an alkaline earth metal of period 2a of the Periodic Table, and (3) a copper salt.

CROSS-REFERENCES TO RELATED APPLICATIONS

This application is a continuation-in-part of U.S. application Ser. No. 473,491, filed July 20, 1965, now abandoned.

This invention relates to a novel accelerator system for promoting the cure of free-radical catalyzed, unsaturated polyester resins, that is, polymerizable mixtures of (A) a polyester of an alpha,beta-ethylenically unsaturated polycarboxylic acid and a polyhydric alcohol and (B) a polymerizable, ethylenically unsaturated compound. More particularly, this invention relates to a synergistic accelerator system comprising (1) a cobalt salt, (2) a salt of an alkaline earth metal of period 2a of the Periodic Table and (3) a copper salt.

The novel accelerator system of this invention is particularly useful inasmuch as it effectively accelerates the cure of free-radical catalyzed, polymerizable unsaturated polyester resins at low temperatures. Unsaturated polyester resins have extensive commercial utility and it is frequently desired to effect the cure of such resins at low temperatures, inasmuch as the type of molds necessary for low temperature cure are less expensive than the diecast molds utilized for curing such resins at elevated temperatures. Furthermore, the low-temperature curing resins do not require expensive energy requirements for maintaining the mold and resin at elevated temperatures.

One difficulty which has generally hindered the manufacture of satisfactory low-temperature cured unsaturated polyester resins has been that the cure is either uneconomically long, or the resins are cured in the presence of an accelerator which produces an undesirable color. One accelerator which has been frequently used for promoting the cure of low-temperature unsaturated polyester resins is cobalt, in the form of a salt soluble in said polyester resins. While cobalt accelerators have generally accelerated the cure of unsaturated polyester resins in a satisfactory manner, it has contributed an undesirable color to the finished article. In Polyesters and Their Applications by Bjorksten, Reinhold Publishing Corp. (1956) at page 63, it is stated: "Many of the metallic accelerators color the resins. Cobalt naphthenate, for example, colors the resin purple red." In Japanese Patent No. 23,314 (1963) it is disclosed that the inclusion of certain calcium salts, in combination with cobalt accelerators, reduces to some extent the undesirable color effect of the cobalt accelerators. Thus, it would be possible to obtain reasonably clear blue colors using the double accelerator of cobalt and calcium salts.

It has now been discovered, however, that if soluble salts of copper are included with a combination of a cobalt accelerator and a salt of an alkaline metal of period 2a of the Periodic Table, substantially colorless, clear neutral or clear blue unsaturated polyester resins may be obtained in considerably less time than has been previously obtained by low-temperature curing of free-radical catalyzed resins. This novel synergistic accelerator system comprises salts which are soluble or substantially soluble in the polymerizable unaturated polyester resin mixture, preferably wherein (1) the soluble salt of cobalt is present in an amount of about 0.0001 percent to 0.05 percent by weight (1 to 500 parts per million) of cobalt metal based upon the total weight of the unsaturated polyester resin, (2) the soluble salt of an alkaline earth metal of period 2a of the Periodic Table is present in an amount of about 0.0002 percent to 0.10 percent by weight (2 to 1000 parts per million) of an alkaline earth metal based upon the total weight of the unsaturated polyester resin and (3) of soluble salt of copper is present in an amount of about 0.00001 percent to 0.002 percent by weight (0.1 to 20 parts per million) of copper metal based upon the total weight of the unsaturated polyester resin present.

The weight ratio of the cobalt metal present to the alkaline earth metal present is preferably from 2 to 1 to 1 to 5. Generally, however, it is preferable to use the cobalt metal and alkaline earth metal in a 1 to 1 weight ratio.

The range for the individual metals present in the novel accelerator system which yields consistently excellent results is about 0.0002 percent to 0.01 percent by weight (2 to 100 parts per million) of the cobalt metal based upon the total weight of the unsaturated polyester resin, about 0.0002 percent to about 0.01 percent (2 to 100 parts per million) of the alkaline earth metal based upon the total weight of the unsaturated polyester resin and about 0.00002 percent to about 0.0004 percent by weight (0.2 to 4 parts per million) of the copper metal based upon the weight of the unsaturated polyester resin present. Especially good results are obtained using .001 percent by weight of cobalt, 0.0012 percent by weight of calcium, and 0.00012 percent by weight of copper.

Although copper has been utilized as an accelerator, the proportions of copper found most useful in this invention are considerably greater than the quantities ordinarily used for the purpose and actually falls within the range used for inhibiting purposes inasmuch as copper ordinarily acts as an inhibitor at higher levels.

The preferred salts of the various metals are salts prepared from organic carboxylic acids, especially acids containing less than 20 carbon atoms and particularly monocarboxylic acids, inasmuch as said salts ordinarily have the greatest solubility in unsaturated polyester resins. However, inorganic salts of such metals may be utilized where such inorganic salts have sufficient solubility in the unsaturated polyester resins to be effectively dissolved or dispersed therein. The preferred alkaline earth metals are calcium and barium, although salts of the other metals of period 2a of the Periodic Table, including beryllium, magnesium, and strontium may also be utilized.

In the practice of this invention, the following salts of cobalt, copper and alkaline earth metals are exemplary of those useful: cobalt acetate, cobalt butyrate, cobalt benzoate, cobalt capronate, cobalt laurate, cobalt palmitate, cobalt octoate, cobalt propionate, cobalt naphthenate, cobalt stearate, copper acetate, copper butyrate, copper benzoate, copper capronate, copper laurate, copper palmitate, copper octoate, copper propionate, copper naphthenate, calcium acetate, calcium butyrate, calcium benzoate, calcium capronate, calcium laurate, calcium palmitate, calcium octoate, calcium propionate, calcium naphthenate, barium acetate, barium butyrate, barium benzoate, barium capronate, barium laurate, barium palmitate, barium octoate, barium propionate, barium naphthenate, magnesium acetate, magnesium benzoate, magnesium laurate, magnesium octoate, magnesium naphthenate, beryllium butyrate, beryllium capronate, beryllium palmitate, beryllium propionate, strontium acetate, strontium butyrate, strontium benzoate, strontium octoate, strontium naphthenate, and the like. Although the above salts are derived from monocarboxylic acids, useful salts may be formed from the above cations and anions derived from polycarboxylic acids, especially dicarboxylic acids, including the following acids: adipic acid, citraconic acid, fumaric acid, maleic acid, oxalic acid, succinic acid, and the like.

Also operative in this invention are inorganic acid salts of cobalt and the alkaline earth metals of Group IIa, particularly where such salts are sufficiently soluble in polyester resins, as for example, salts such as hydroxides, chlorides, bromides, sulfates and the like.

The anion portions of the salts of copper, cobalt and alkaline earth metals have minimal, if any, effect upon the accelerator characteristics of the novel accelerator system described herein. The anion portion of salt does, however, contribute solubility to the metal; thus, the anion portion of these salts is preferably any radical, organic or inorganic, which promotes the solubility of the metal in the unsaturated polyester resin. As noted above, the preferred anion is derived from organic carboxylic acids.

The individual salts of the novel accelerator system may be added separately to the polymerizable unsaturated polyester resin or the alkaline earth metal and cobalt metal may be added in the form of a double salt. Also, the order of addition of the individual salts is not critical, the only requirement being that all three salts are present during the free-radical catalyzed polymerization.

As set forth above, the novel accelerator system of this invention promotes the curing of free-radical catalyzed unsaturated polyester resins which are polymerizable mixtures of (A) a polyester of an alpha,beta-ethylenically unsaturated polycarboxylic acid and a polyhydric alcohol and (B) a monomer containing a vinyl group. The ethylenically unsaturated polycarboxylic acids include such acids as: maleic acid, fumaric acid, aconitic acid, mesaconic acid, citraconic acid, itaconic acid, and halo and alkyl derivatives of such acids and the like; the preferred acid being maleic acid. The anhydrides of these acids, where the anhydrides exist, are, of course, embraced under the term "acid," since the polyesters obtained therefrom are essentially the same whether the acid or anhydride is utilized in the reaction. The ethylenically unsaturated dicarboxylic acids are conventionally employed in an amount of about 10 mol percent to about 100 mol percent, although preferably in an amount of about 20 mol percent to about 80 mol percent of the total mols of acid component in the polyester.

The polyhydric alcohols useful in preparing unsaturated polyester resins include: ethylene glycol, diethylene glycol, triethylene glycol, polyethylene glycol, propylene glycol, dipropylene glycol, polypropylene glycol, glycerol, neopentyl glycol, pentaerythritol, trimethylol propane, trimethylol ethane, and the like. The preferred polyols for the purposes of this invention have a molecular weight of less than about 2000 and consist essentially of carbon, hydrogen and oxygen. The polyhydric alcohols are generally employed in an equal molar ratio to the total acid components, or as a slight excess, as, for example, about 5 mol percent excess.

Saturated dicarboxylic acids may be utilized in combination with the unsaturated acid or anhydride in the preparation of unsaturated polyester resins. Such acids increase the length of the polyester without adding additional cross-linking sites, which is a desired feature in some polyesters. Examples of useful dicarboxylic acids which are either saturated or only aromatically unsaturated include: succinic acid, adipic acid, suberic acid, azelaic acid, sebacic acid, phthalic acid, isophthalic acid, terephthalic acid, tetrachlorophthalic acid, hexachloroendomethylenetetrahydrophthalic acid, and the like. As in the case of the ethylenically unsaturated acids, the anhydrides of these acids, where the anhydrides exist, are, of course, embraced in the term "acid," since the polyesters obtained therefrom are the same. Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatically unsaturated dicarboxylic acids. Such "saturated carboxylic acids" may also be referred to as "non-olefinically unsaturated" polycarboxylic acids.

Vinyl monomers which crosslink with unsaturated polyesters to form thermosetting materials, include such monomers as: styrene, alpha-methyl styrene, divinyl benzene, vinyl acetate, allyl acetate, diallyl phthalate, diallyl succinate, diallyl adipate, diallyl sebacate, methyl acrylate, methyl methacrylate, hexyl acrylate, octyl acrylate, octyl methacrylate, diallyl itaconate, diallyl maleate, diallyl fumarate, triallyl cyanurate, and the like. The preferred monomers are liquid compounds, soluble in the polyester components. Such monomers should preferably be free of non-aromatic carbon-carbon conjugated double bonds.

The monomer component or components may be employed over a broad range, but usually the proportion thereof, upon a weight basis, will be less than the polyester component. The amount of monomer should be sufficient to provide a liquid, flowable, interpolymerizable mixture. Ordinarily, the percentage of monomer will fall within the range of about 10 percent to about 60 percent by weight of the total mixture of polyester and monomer. At the preferred range, the monomer is present in an amount of about 20 percent to about 50 percent.

Since the polyester component of the interpolymerizable mixture is often highly viscous or even solid at atmospheric temperatures, it is preferred to add the monomer thereto at a temperature sufficient to render the polyester satisfactorily fluid for incorporation with the monomer. This temperature is usually in the range of about 100° C. to about 120° C., which is sufficiently high, in the absence of gelation inhibitors, to induce premature gelation upon introduction of the monomer into the system. This is true even in the absence of free-radial catalysts.

Accordingly, it is preferred to include a gelation inhibitor in one or both components of the mixture. Suitable inhibitors may be selected from the quinonic or phenolic class or from a group of quaternary ammonium salts and amine salts, especially amine halide salts. Suitable inhibitors of the quinonic or phenolic class include: p-benzoquinone, chloranil, hydroquinone, 3-isopropyl catechol, 4-t-butyl catechol, 3-methyl catechol, 4-ethyl catechol, 4-isopropyl catechol, and the like.

The following are representative examples of halide salts of amines which may be employed as inhibitors: trimethylamine hydrochloride, trimethylamine hydrobromide, dimethylaniline hydrochloride, triethylamine hydrochloride, tri-n-butylamine hydrochloride, tribenzylamine hydrobromide, N-benzylaniline hydrochloride, and the like. Useful quaternary ammonium salts include: trimethyl benzyl ammonium acid oxalate, trimethyl benzyl ammonium chloride, di(trimethyl benzyl ammonium) oxalate, trimethyl benzyl ammonium maleate, trimethyl benzyl ammonium tartrate, and the like. Other useful ammonium compounds and amine halide compounds are disclosed in U.S. Patents 2,593,787 and 2,646,416, respectively. The quaternary ammonium salts or amine halide salts represent a preferred type of inhibitor for utilization with the novel accelerator system of this invention, although satisfactory results are also achieved when phenolic inhibitors or quinonic inhibitors are utilized.

The gelation inhibitor remains in the solution of polyester interpolymerizable monomer and acts as an inhibitor of gelation during subsequent storage of material before the latter is actually used. The amount of inhibitor required in the mixture during the mixing stage is susceptible to wide variation, but conveniently is in a range of about 0.001 percent to about 0.1 percent by weight, based upon the polyester component of the mixture. Interpolymerizable mixtures of polyesters of alpha-beta-ethylenically unsaturated dicarboxylic acids and monomers containing an inhibitor, as above described, may be stored over substantial periods of time, for example, several weeks or even months, without premature gelation.

As noted above, it is common practice to include an accelerator in the inhibited unsaturated polyester resin so that it is necessary only to add a polymerization catalyst in order to cure the resin. When the interpolymerizable mixture is to be employed in the preparation of castings or laminates, or other products in accordance with the provisions of the present invention, there is employed a free-radical catalyst, which is an organic peroxide, organic hydroperoxide or esters thereof, and which is activated by an accelerator. Typical organic peroxides useful as catalysts for unsaturated polyester resins include: benzoyl peroxide, acetyl peroxide, lauroyl peroxide, methyl ethyl ketone peroxide, cyclohexanone peroxide, and the like.

Organic hydroperoxides or their esters with carboxylic acids useful as catalysts for unsaturated polyester resins include: cumene hydroperoxide, tertiary butyl hydroperoxide, ditertiary butyl perphthalate, methyl ethyl ketone peroxide, 1-hydroxycyclohexyl hydroperoxide, and the like. For the purposes of this invention, the organic hydroperoxides represent a preferred class of catalysts, and best results have been obtained with methyl ethyl ketone peroxide.

Many other useful catalysts are disclosed in the monograph "Organic Peroxides" by A. V. Tovolsky and R. B. Mesrobian, copyrighted in 1954 by Interscience Publishers, Inc., New York, pages 158–163. These catalysts may be utilized in amounts of about 0.1 percent to about 5 percent by weight based upon the mixture of interpolymerizable materials. Naturally, the amount of inter-organic peroxide catalyst applicable in the practice of the invention will vary with the activity of the particular accelerator and with the amount of inhibitor present in the interpolymerizable mixture. All of the organic free-radical compounds constitute catalysts of interpolymerization at elevated temperatures and are desirable in order to obtain a complete and thorough cure in the mixtures within reasonable periods of time and at reasonable temperatures. Such catalysts effectively cure unsaturated polyester resins at low temperatures when an appropriate accelerator is present, such as the novel accelerator system of this invention.

For a thorough discussion of unsaturated polyester resin preparation, raw materials therefor, and appropriate polymerization catalysts, inhibitors, accelerators, and the like, attention is directed to "Polyesters and Their Applications" by Bjorksten, Reinhold Publishing Corporation (1956), pages 21–73 especially.

Thermoset polyester products are conventionally prepared in the following manner:

(1) An unsaturated polyester is produced from the esterification of an alpha,beta-ethylenically unsaturated polycarboxylic acid and optionally a polycarboxylic acid containing no olefinic unsaturation, and a polyol. Such unsaturated polyesters ordinarily have an acid value in the range of about 10 to about 50.

(2) The unsaturated polyester thus prepared is inhibited with a quinonic, phenolic, quaternary ammonium salt or amine salt inhibitor, and admixed, generally while still warm, with a liquid, ethylenically unsaturated compound such as styrene.

(3) The unsaturated polyester resin (blend of unsaturated polyester and vinyl monomer) is admixed with a small quantity of an accelerator, or combination of accelerators. The accelerators are conventionally added prior to the addition of a polymerization catalyst, although the catalyst may be added prior to the accelerator if the resin is to be utilized without being subjected to prolonged storage. The advantage of adding the accelerator prior to the catalyst is that the polyester resin containing accelerator may be stored for long periods and then activated by the addition of a polymerization catalyst.

The instant invention permits the preparation of substantially clear thermoset polyester articles in a minimum of time at low temperatures. As noted above, polyester resins cured at elevated temperatures tend to discolor, while resins polymerized at low temperatures tend to cure very slowly unless a cobalt salt is present. However, the cobalt salts discolor the resins unless utilized in the manner of the instant invention.

The novel accelerator system disclosed herein may be utilized by adding each salt individually, simultaneously, or with the cobalt and alkaline metal in the form of a double salt. The novel accelerator results are achieved whenever all three of the above-described salts of copper, cobalt and alkaline earth metal are present in an unsaturated polyester resin.

The following examples set forth specific embodiments of the instant invention; however, the invention is not to be construed as being limited to these embodiments, for there are, of course, numerous possible variations and modifications.

EXAMPLE 1

The accelerator effect of various combinations of salts of copper, cobalt and calcium were tested in the following unsaturated polyester resin composition:

|   | Parts |
|---|---|
| Polyester component | 66 |
|     5 moles maleic anhydride | |
|     5 moles phthalic anhydride | |
|     4 moles diethylene glycol | |
|     6.8 moles propylene glycol | |
|     Acid No. 41 | |
| Styrene | 34 |
| Hydroquinone | .005 |
| TEAC (tetraethylammonium chloride) | .05 |

| Test designation | Accelerator system (percent by wt.) | Methyl ethyl ketone peroxide (percent by wt.) | Gel time at 75° F. (minutes) | Color of cured resin |
|---|---|---|---|---|
| A | 0.1 Ca-Co solution,[1] 0.002 copper naphthenate.[2] | 1.0 | 22 | Clear. |
| B | 0.2 Ca-Co solution, 0.002 copper naphthenate. | 1.0 | 19 | Slight yellow. |
| C | 0.1 Ca-Co solution, 0.004 copper naphthenate. | 1.0 | 21 | Slight green. |
| D | 0.006 copper naphthenate | 1.0 | 18 | Green. |
| E | 0.3 Ca-Co solution | 1.0 | 100 | Clear. |
| F | 0.15 Ca-Co solution, 0.003 copper naphthenate. | 1.0 | 19 | Do. |
| G | 1.0 Ca-Co solution, 0.004 copper naphthenate. | 1.0 | 10 | Light. |
| H | 0.01 cobalt octoate, 0.004 copper naphthenate. | 1.0 | 15 | Deep violet. |
| I | 0.1 cobalt octoate, 0.004 copper naphthenate. | 1.0 | 9 | Yellow. |

[1] Ca-Co solution.—5 grams of calcium octoate (5% by weight Ca), 3.07 grams of cobalt octoate (12% by weight Co), 72 grams styrene.
[2] Copper naphthenate utilized in above tests contained 8 percent by weight of copper.

The gel time reported above is the time required for the resin to reach a gelatin-like condition after the addition of the catalyst and accelerator.

The accelerator systems containing salts of cobalt, calcium and copper yielded resins which had a superior combination of color and gel time, when compared with the acceleration systems containing only one or two of these salts. Resin D, containing only copper naphthenate as an accelerator, yielded a resin which had a green color and cured very slowly even though it gelled relatively rapidly. Resin E, which contained only salts of calcium and cobalt as an accelerator, yielded a resin with a clear color, but which gelled and cured very slowly. In fact, it was found that after as long as 12 or more hours, castings of resins containing only copper salts or mixtures of calcium salts and cobalt salts had a Barcol hardness of zero, indicating incomplete cure. On the other hand, castings of resins containing the acceleration system of this invention had a Barcol hardness of 50–55 after only 4 hours. A Barcol hardness of 40 is considered indicative of complete cure.

In the above examples, the substitution of a soluble barium salt for calcium produces equivalent results. Substantially equivalent results are also obtained when other soluble salts of copper are substituted for copper naphthenate.

EXAMPLE 2

The effects of a combination accelerator system of (1) salts of calcium and cobalt and (2) salts of copper, calcium and cobalt were determined upon the following unsaturated polyester resins:

Polyester resin X

| | Parts |
|---|---|
| Polyester component | 65 |
| 7 moles of phthalic anhydride | |
| 3 moles of maleic anhydride | |
| 10.4 moles propylene glycol | |
| Acid No. of 50.3 | |
| Styrene | 35 |
| Hydroquinone | 0.006 |
| Trimethylbenzyl ammonium chloride | 0.03 |

Polyester resin Y

| | Parts |
|---|---|
| Polyester component | 65 |
| 7 moles of phthalic anhydride | |
| 3 moles of maleic anhydride | |
| 7.4 moles propylene glycol | |
| 3 moles diethylene glycol | |
| Acid No. of 20 | |
| Styrene | 35 |
| Methyl hydroquinone | 0.002 |
| Trimethylbenzyl ammonium chloride | 0.1 |

The above polyester resins were catalyzed with methyl ethyl ketone peroxide and various quantities of Ca-Co solution in combination with copper naphthenate in order to determine the effectiveness of such an accelerator system. A control test was performed wherein the accelerator system did not contain a copper salt. The amounts of calcium, cobalt, and copper are listed in terms of the percent of metal in the resin. The results are tabulated as follows:

| Test designation | Resin | Accelerator system (percent by wt.) | Methyl ethyl ketone peroxide (percent by wt.) | Gel time at 75° F. (minutes) | Color code |
|---|---|---|---|---|---|
| A | X | 0.003 Ca, 0.005 Co | 1.0 | 240 | 3 |
| B | X | 0.003 Ca, 0.005 Co, 0.00016 Cu | 1.0 | 25 | 3 |
| C | X | 0.003 Ca, 0.005 Co, 0.00008 Cu | 1.0 | 31 | 3 |
| D | X | 0.003 Ca, 0.005 Co, 0.000016 Cu | 1.0 | 53 | 3 |
| E | X | 0.0045 Ca, 0.0075 Co, 0.00016 Cu | 1.0 | 35 | 3 |
| F | X | 0.006 Ca, 0.010 Co, 0.00008 Cu | 1.0 | 32 | 3 |
| G | X | 0.0045 Ca, 0.0075 Co, 0.00016 Cu | 2.0 | 15 | 4 |
| H | X | 0.009 Ca, 0.015 Co, 0.00016 Cu | 1.0 | 25 | 5 |
| I | X | 0.003 Ca, 0.005 Co, 0.00064 Cu | 2.0 | 10 | 5 |
| J | X | 0.003 Ca, 0.005 Co, 0.00016 Cu | 2.0 | 17 | 4 |
| K | X | None (cured at elevated temperatures, 1 hour at 170° F. and 1 hour at 250° F.). | 1.0 | | 6 |
| L | X | None | 1.0 | [1] 24 | 1 |
| M | Y | 0.001 Ca, 0.0012 Co, 0.00011 Cu | 1.0 | 15.3 | 2 |
| N | Y | 0.0002 Ca, 0.0001 Co, 0.00001 Cu | 1.0 | 35 | 2 |
| O | Y | 0.0002 Ca, 0.0001 Co, 0.002 Cu | 1.0 | 20.5 | 3 |
| P | Y | 0.1 Ca, 0.0001 Co, 0.002 Cu | 1.0 | 37.8 | 3 |
| Q | Y | 0.1 Ca, 0.05 Co, 0.00001 Cu | 1.0 | 7.2 | 5 |
| R | Y | 0.1 Ca, 0.05 Co, 0.002 Cu | 1.0 | 6.3 | 5 |

[1] Hours.
Color code designation: 1=water white; 2–3=excellent clear color; 4–5=acceptable clear color; 6=unacceptable color.
NOTE.—The copper metal utilized was derived from copper naphthenate containing 8 percent by weight copper.

Higher and lower amounts of the cobalt-calcium salt may be utilized, for example, the substitution of 0.5 percent by weight of the calcium-cobalt solution in the above example, in combination with levels of copper naphthenate from 0.0005 percent by weight to 0.01 percent by weight, yielded resins which cured rapidly to form a clear, hard thermoset material. Also when other of the salts of cobalt, alkaline earth metals or copper disclosed above are substituted for those of the examples, generally equivalent accelerator effects are obtained.

In the above examples, the inhibitors utilized were quaternary ammonium salts; however, substitution of phenolic, quinonic or, especially, amine halide salts in the above examples gives comparable results.

Although specific examples of the instant invention have been set forth hereinabove, it is not intended that the invention be limited solely thereto, but to include all the variations and modifications following within the scope of the appended claims.

We claim:
1. A composition comprising
   (A) a liquid, polymerizable, ethylenically unsaturated compound,
   (B) a polyester of a dihydric compound and an alpha, beta-dicarboxylic, ethylenically unsaturated acid, and
   (C) an accelerator mixture of
      (1) a soluble salt of cobalt, the cobalt metal being present in an amount of 0.0001 percent to 0.05 percent by weight of components (A) and (B),
      (2) a soluble salt of an alkaline earth metal of period 2a of the Periodic Table, said alkaline earth metal being present in an amount of 0.0002 percent to 0.10 percent by weight of components (A) and (B), and
      (3) a soluble salt of copper, the copper metal being present in an amount of 0.00001 percent to 0.002 percent by weight of components (A) and (B),
         wherein the weight ratio of cobalt metal to alkaline earth metal is from 2:1 to 1:5.

2. A composition comprising
   (A) a liquid polymerizable, ethylenically unsaturated compound,
   (B) a polyester of a dihydric alcohol and an alpha, beta-ethylenically unsaturated dicarboxylic acid,
   (C) a polymerization inhibitor, and
   (D) an accelerator mixture of
      (1) a soluble salt of cobalt, the cobalt metal being present in an amount of from about 0.0001 percent to 0.05 percent by weight of components (A) and (B),
      (2) a soluble salt of an alkaline earth metal of Period 2a of the Periodic Table, the alkaline earth metal being present in an amount of from about 0.0002 percent to 0.10 percent by weight of components (A) and (B), and
      (3) a soluble salt of copper, the copper metal being present in an amount of from about 0.00001 percent to 0.002 percent by weight of components (A) and (B),
         wherein the weight ratio of cobalt metal to alkaline earth metal is from 2:1 to 1:5.

3. The composition of claim 2 wherein the cobalt salt, the copper salt and the alkaline earth metal salt are each salts of organic carboxylic acids containing less than 20 carbon atoms.

4. The composition of claim 3 wherein the liquid, polymerizable, ethylenically unsaturated compound is styrene.

5. The composition of claim 3 wherein the cobalt salt is cobalt octoate.

6. The composition of claim 5 wherein the copper salt is copper naphthenate.

7. The composition of claim 6 wherein the alkaline earth metal salt is calcium octoate.

8. The composition of claim 7 wherein the cobalt and the alkaline earth metal are present in the form of a double salt of a dicarboxylic acid.

9. The composition of claim 7 wherein the cobalt metal comprises 0.001 percent of components (A) and (B), the calcium metal comprises 0.0012 percent of the components (A) or (B), and the copper metal comprises 0.00012 percent of the components (A) and (B).

10. A method of accelerating the free radical catalyzed cure of a composition comprising
   (A) a liquid, polymerizable, ethylenically unsaturated compound, and
   (B) a polyester of a dihydric alcohol and an alpha, beta-ethylenically unsaturated dicarboxylic acid which comprises incorporating into said composition a mixture of
      (1) a soluble salt of cobalt, the cobalt metal being present in an amount of from about 0.0001 percent to 0.05 percent by weight of components (A) and (B),
      (2) a soluble salt of an alkaline earth metal of Period 2a of the Periodic Table the alkaline earth metal being present in an amount of from about 0.0002 percent to 0.10 percent by weight of components (A) and (B), and
      (3) a soluble salt of copper, the copper metal being present in an amount of from about 0.00001 percent to 0.002 percent by weight of components (A) and (B),
         wherein the weight ratio of cobalt metal to alkaline earth metal is from 2:1 to 1:5.

11. The method of caim 10 wherein the cobalt salt, the alkaline earth metal salt and the copper salt are salts of organic carboxylic acids containing less than 20 carbon atoms.

12. The method of claim 11 wherein the cobalt salt is cobalt octoate.

13. The method of claim 12 wherein the alkaline earth metal salt is calcium octoate.

14. The method of claim 12 wherein the copper salt is copper naphthenate.

15. The method of claim 10 wherein the cobalt salt and the alkaline earth metal salt are added in the form of a double salt of a dicarboxylic acid.

16. The method of claim 15 wherein the cobalt metal comprises 0.001 percent of components (A) and (B), the calcium metal comprises 0.0012 percent of the components (A) or (B), and the copper metal comprises 0.00012 percent of the components (A) and (B).

References Cited

UNITED STATES PATENTS

| 2,642,410 | 6/1953 | Hoppens | 260—863 |
| 2,646,416 | 7/1953 | Parker | 260—22 |
| 2,931,784 | 4/1960 | Raymond | 260—863 |
| 3,028,360 | 4/1962 | Brooks et al. | 260—863 |
| 3,091,936 | 6/1963 | Lundberg et al. | 260—863 |
| 3,188,363 | 6/1965 | Amidon et al. | 260—863 |
| 3,360,589 | 12/1967 | Raichle et al. | 260—863 |

FOREIGN PATENTS 967,921   8/1964   Great Britain.

OTHER REFERENCES

American Cyanamid, Abstract of Australian Patent Application No. 57,790/60, August 1960.

Matsumoto et al., Chemical Abstracts, vol 60, p. 4308(D) Feb. 17, 1964.

DONALD E. CZAJA, *Primary Examiner.*

R. W. GRIFFIN, *Assistant Examiner.*

U.S. Cl. X.R.

260—23, 32.4, 32.6, 33.4, 863